July 14, 1931.                G. WALKER                1,814,873
                                SCALE
                         Filed March 21, 1929        2 Sheets-Sheet 1
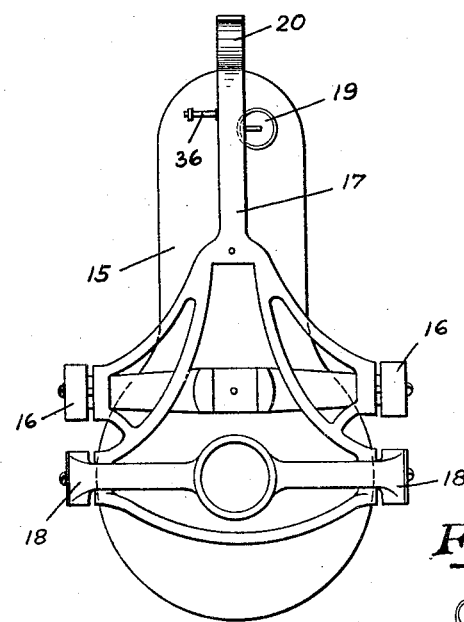
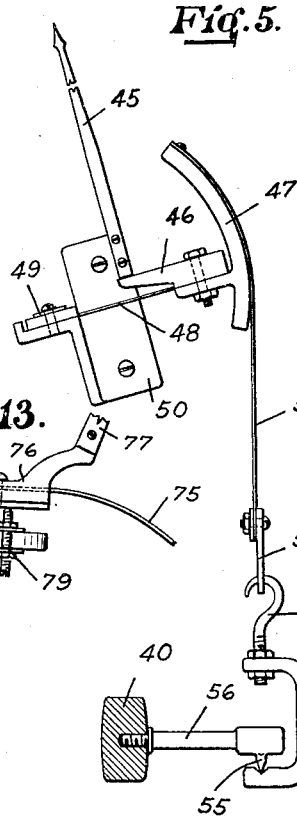
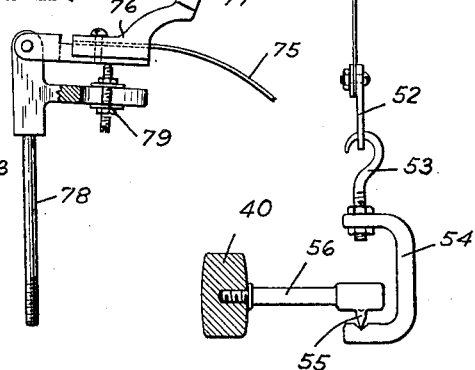
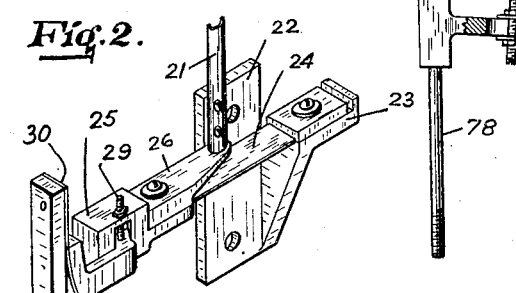
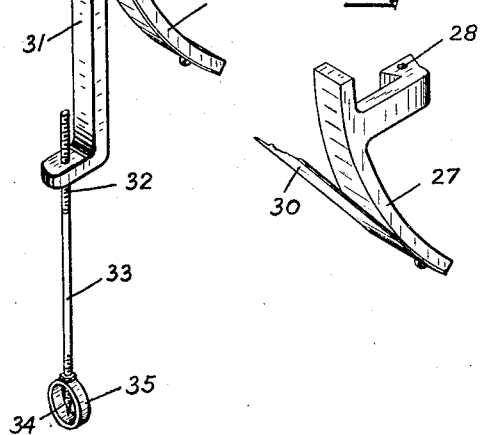
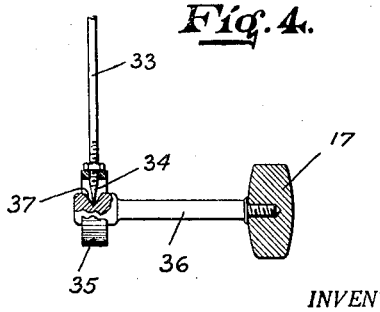
INVENTOR.
George Walker
BY
ATTORNEYS.

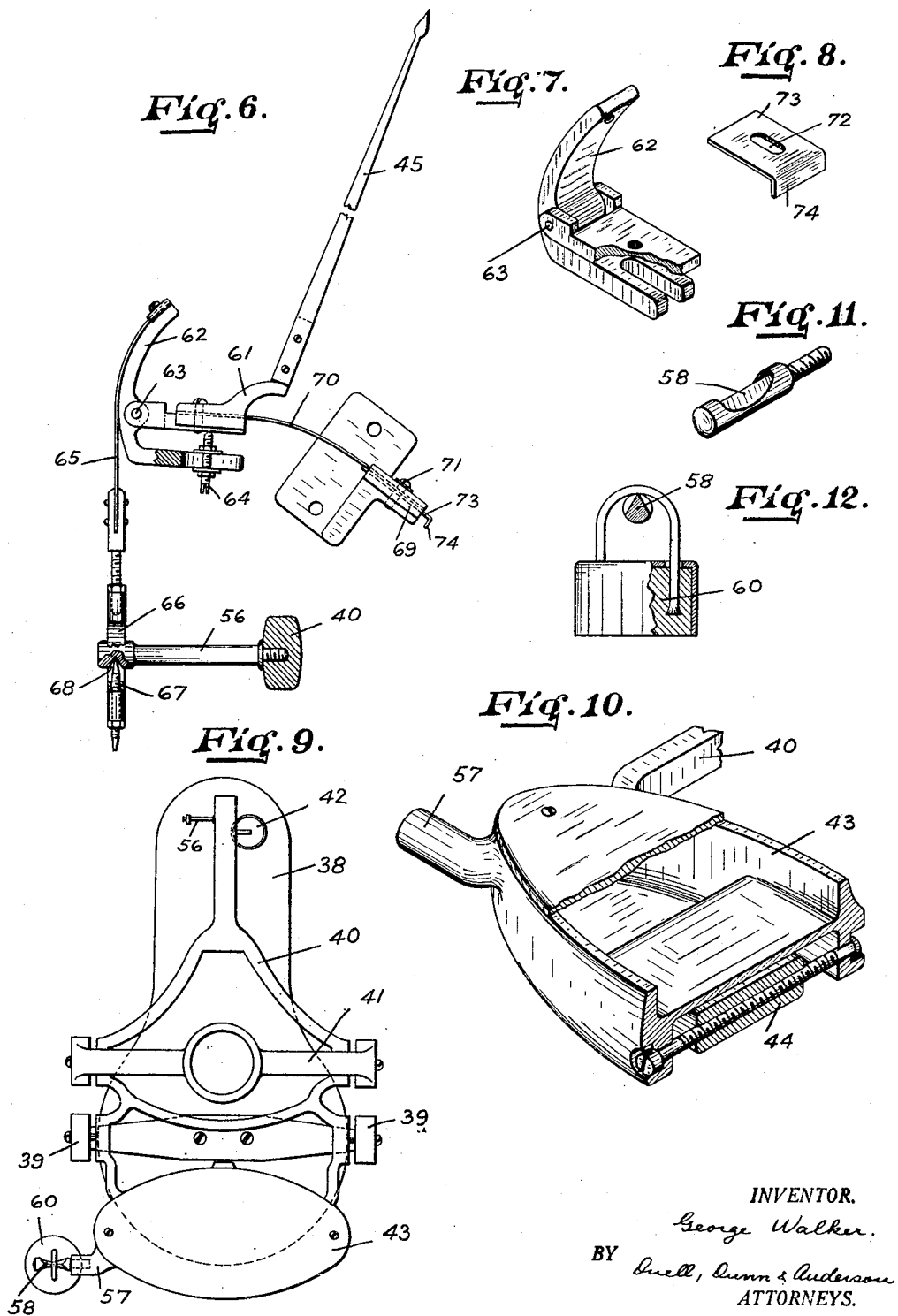

Patented July 14, 1931

1,814,873

UNITED STATES PATENT OFFICE

GEORGE WALKER, OF BROOKLYN, NEW YORK, ASSIGNOR TO THE JACOBS BROS. CO. INC., OF BROOKLYN, NEW YORK, A CORPORATION OF NEW YORK

SCALE

Application filed March 21, 1929. Serial No. 348,755.

This invention relates to a functionally and structurally improved scale.

It is an object of the invention to provide a device of this character, the parts of which will be relatively few in number and individually simple and rugged in construction, these parts being capable of being assembled readily and the entire scale being "set up" with a minimum of effort and time, to produce a weighing apparatus which will have a long life with freedom from mechanical or other difficulties.

A further object of the invention is that of furnishing a scale, particularly of the "fan" type, in which friction will be virtually eliminated and in which the amount of weight will be accurately and quickly indicated, the present invention also contemplating the provision of a scale of this type which may have an "increased capacity" factor.

A further object is that of constructing a scale in which the parts are so designed that if adjustment becomes necessary, such adjustment may be made readily, this provision being also particularly desirable in connection with the original proper assembling of the scale parts.

With these and further objects in mind, reference is had to the attached sheets of drawings illustrating practical embodiments of the invention, and in which:—

Fig. 1 is a plan view of one form of scale with which this invention may be associated.

Fig. 2 is a perspective view of an embodiment of the invention and discloses the registering and associated mechanism.

Fig. 3 is a perspective view of part of the mechanism disclosed in Fig. 2.

Fig. 4 is a partly sectional view of a connecting arm for association with the scale mechanism.

Fig. 5 is a partly sectional view of a modified form of scale mechanism.

Fig. 6 is a partly sectional view of a still further form of scale mechanism.

Fig. 7 is an enlarged perspective view of a detail of the mechanism shown in Fig. 6.

Fig. 8 is an enlarged perspective view of still another detail of said scale mechanism.

Fig. 9 is a plan view of another type of scale with which the invention herein described may be used.

Fig. 10 is a perspective view of a detail of a scale shown in Fig. 9.

Fig. 11 is an enlarged perspective view of a bearing member.

Fig. 12 is a partly sectional view of the member in association with a counter-weight and Fig. 13 is a partly sectional view of still another form of scale mechanism.

Referring primarily to Figs. 1 to 4, it will be noted that the numeral 15 indicates the scale base, from which there extends a yoke 16 having suitable bearings (not shown) to support the beam 17. This beam mounts, adjacent its outer end, a pan support 18 and is connected at its inner end with a dash pot 19, it being finally observed that for a purpose hereinafter brought out, the inner end of the beam may terminate in a receiving portion 20. This beam and its associated parts are so balanced that they will assume horizontal positions, and oscillations of the beam will be dampened by the dash pot.

Now with a view to providing means which will register deflections of the beam from horizontal positions, a casing is mounted adjacent the inner end of the base 15. This casing has an opening within which a chart is visible and the graduations of this chart are traversed by a pointer 21. With the exception of the latter, none of the foregoing has been shown, in that the shape of the casing, its exact position with relation to the beam, the specific indicia of the chart, etc., are well known to any one skilled in the art of scales and these elements,—except in so far as they are necessary to provide a complete scale,— form no part of the present invention.

Suffice it to say that a bracket portion may either form a part of the dial casing or this element, which has been indicated at 22, may be in the nature of a separate unit firmly attached thereto. An extension 23 forms a part of the bracket and the inner end of a flexion strip 24 is adjustably clamped to this extension. The inner end of the strip may be similarly secured to a block 25 and an arm 26 extends from this block and has the lower end of the pointer 21 secured to it. A curved contact element 27 is associated with the block 25 and this connection is preferably provided by the use of an under cut slot formed in the block and within which a dove-tailed extension 28 of the contact element rides, relative movement between the parts being provided by an adjusting and locking screw 29. At its lower end the contact element fixedly carries a connecting member 30, the upper end of which is secured to a bar 31 mounted upon the screw threads 32 forming a part of a rod 33. This rod may terminate in a screw-threaded and pointed bearing portion 34, with which a retaining member 35 is associated. Extending from the beam is an arm 36 having at its outer end a bearing recess 37 and the end portion 34 rests within this recess, as shown in Fig. 4, and displacement of these parts is prevented, obviously, by the retaining member 35.

It will be obvious, in a scale of this character, that with the parts properly "set up" the beam will extend in a horizontal condition and the flexion strip, together with its associated parts, will assume the condition illustrated in Fig. 2. If, now, a load is placed upon the pan associated with the support 18, the inner end of the beam will move upwardly and against the increasing resistance offered to such movement by the flexion strip. This will occur incident to the fact that the connecting member 30 will transmit the movements of the bar 31 to the element 27. While referring to this point it is well to note that the contact element 27 has a curvature corresponding, preferably, to a cam face. In other words, its bearing surface is not at all points equi-distant from the inner end of the flexion strip. This is extremely desirable according to the present invention in that, by such a construction, the pointer 21 will have movements of equal range for all given equal increases in load-thrust upon the pan support. In other words, it is apparent that the outer end of the flexion strip might be deflected a given number of degrees upon one ounce thrust being exerted upon it, but such deflection would not be five times as great if a five ounce thrust were utilized, in that the flexion strip offers a progressively increasing resistance to deflection. Thus,—while it is not absolutely necessary,—if, in accordance with the present invention this feature is employed, a registering range will be presented, the sub-divisions of which are equi-distant throughout such entire range. In this connection it will be observed, moreover, that preferably, according to the present invention, the load supporting arm of the beam is far shorter than that of the thrust imparting arm thereof. As a consequence, it will not be necessary to employ a strip which will offer a large measure of resistance to deflection, with consequent danger of inaccuracy in the case of weighing comparatively light objects.

The value of the receiving portion 20 will now be apparent in that, necessarily, in any scale of this type, danger of inaccuracy exists if too great a range of movement and weighing is permitted. On the other hand, it sometimes becomes necessary to weigh an object exerting a thrust greater than the capacity of the scale. If, now, such a load is imposed upon the pan support 18 the inner end of the beam will be thrown upwardly to the full limit of its movement. However, by virtue of the receiving portion 20, it is practicable to dispose a counterweight in association with the inner end of the beam and the weight value of which is known, so that objects nominally beyond the range of the scale may have their weight registered with accuracy. Finally, it will be appreciated that the receiving portion preferably extends beyond the casing, so as to be readily accessible to the operator.

Now referring to the structures shown in Figs. 5 to 12 inclusive, it will be noted that a scale has been shown which includes a base 38, from which a standard 39 extends upwardly. This standard or yoke rockingly supports a beam 40 mounting a pan support 41, and the inner end of the beam preferably has a dash pot 42 associated with it. The beam is normally balanced or maintained in neutral position by, for example, counterbalancing its structure with a weight 43 which is disposed adjacent its outer end and this weight, as shown in Fig. 10, may have a recessed body for the reception of a subsidiary weight 44 adjustable longitudinally of the beam axis so that accurate compensations may be made.

As in the preceding form of scale, a casing for a dial is provided adjacent the inner end of the beam and the indicia of the chart within this casing is traversed by a pointer 45. This pointer, as shown in Fig. 5, may be mounted upon an extension 46 which is secured to a transmitting element 47, the outer face of which is curved, preferably as in the manner afore-described in connection with the element 27. These members are secured to the outer end of a flexion strip 48 and the inner end thereof is adjustably mounted as at 49, to a bracket 50 which is either an integral portion of the casing or, preferably, as shown, is a separate unit. From the element 47 a connecting member 51 extends, the upper end of which is secured to this element, its body lying in contact with the curved face thereof. The lower end of the connecting member is secured by, for example, a loop and hook structure indicated at 52 and 53 to a coupling element 54 having a bearing recess within which the bearing member 55 of an arm 56 extends, this arm being secured to the beam 40.

Obviously, as loads are imposed upon the pan support 41, the inner end of the beam 40 will be depressed, which will flex the strip 48 and the weight value of the imposed load will be accurately indicated by the registering mechanism including the pointer 45, it being here noted that if a factor of "increased capacity" is desired, the outer end of the beam may be provided with an extension 57 which mounts a knife edge support 58 for the reception of a counter-weight 60. It will be observed that due to the manner in which the support 58 is constructed—i. e. a recessing of the face thereof—that the loop of the weight will not readily become accidentally detached from this support, and thus no difficulties will be experienced in this connection.

In most instances it is desirable, in lieu of the structure just described, to employ the structure illustrated in Fig. 6, in which the pointer 45 is secured, at its outer end, to the bracket 61, which rockingly carries a contact element 62 by means of pivots 63. For the purposes of adjustment, the lower portion of the contact element may be extended substantially parallel to the under side of the bracket and carry, at this point, an adjusting screw 64 which bears against the under side of such bracket. It is here to be noted that the face of the contact element is preferably curved, as has been previously described, and it is obvious that, by varying the position of the screw 64 or other element employed for this purpose, the scale mechanism may be adjusted with that degree of nicety which will assure perfect operating results. Secured to the upper end of the element 62 is a connecting member 65. This member, as well as the members shown in previously described views, are preferably in the nature of metal tapes. Obviously, however, any desired equivalent structure might be employed. Secured to the lower end of the member 65 is a loop element 66 carrying a bearing screw 67, the reduced upper end portion of which seats within a bearing recess 68 forming a part of the arm 56.

In this view, and in Figure 8, the preferred method of adjusting the flexion strip is shown, which embraces the thought of employing a recessed support 69—which may form a part of the bracket or an integral portion of the casing. The inner end of the flexion strip 70 is clamped as, for example, by a screw 71 and this screw passes through the opening 72 of a supporting member 73 having a contact portion 74. It is obvious that after the scale is "set up" and such other adjustments as are necessary have been made, that the tester, by simply shifting the supporting member inwardly or outwardly with respect to the strip, varies the effective flexion thereof so that the scale will read true over its entire range. Obviously, this feature of the invention is not necessarily limited to scales of this particular type in that this adjustment has been found to be of great value in connection with scales, generally, and flexion strips in particular.

Finally, referring to Figure 13, it will be observed that a structure has been shown which, in certain aspects, is not as desirable as that illustrated in Fig. 6, but which structure may be advantageously employed in certain instances. In this view the numeral 75 indicates a flexion strip, the outer end of which is secured to a bracket 76 carrying a pointer 77. This bracket is pivotally or otherwise attached to a rod 78 having suitable connection with the beam and an adjusting member 79 in the nature of a screw may be employed in order to compensate for various factors before and during the use of the scale.

From the foregoing it will be appreciated that, among others, the several objects specifically aforementioned are achieved. It is intended, however, that numerous changes in construction and rearrangement of parts might be resorted to without departing from the spirit of the invention as defined in the claims.

Having described my invention, what I claim as new and desire to secure by Letters Patent is:

1. A scale including a rockingly mounted beam, a resilient element disposed in a substantially horizontal plane and adapted to be flexed transversely of its body, a registering mechanism including an indicating member connected to said element and extending substantially at right angles to the body thereof and means connecting said element to said beam.

2. A scale including a rockingly mounted beam, a resilient element to be flexed transversely of its body, means for fixedly supporting one end of said element, a registering mechanism including an indicating member secured to the opposite end of said element and extending substantially at right angles thereto and means having one of its ends connected to said element adjacent the point of connection of the member therewith and the opposite end thereof being connected to said beam.

3. A scale including a rockingly mounted beam, a flexion strip, means for retaining one end of said strip against movement, a registering mechanism including an indicating member secured to the opposite end of said strip and extending substantially at right angles thereto, and means connected to the latter end of said strip and to said beam for operatively coupling the flexion strip thereto.

4. A scale including a rockingly mounted beam, a resilient element to be flexed transversely of its body, means for fixedly mounting one end of said element, means for connecting the opposite end of said element to said beam and a registering mechanism including an indicating member connected to said strip and extending therefrom substantially centrally of its body.

5. A scale including a rockingly mounted beam, a resilient element to be flexed transversely of its body, means for fixedly mounting one end of said element, means for connecting the opposite end of said element to said beam and a registering mechanism including an indicating member and means connecting said member to said latter strip end to have said member extend substantially centrally from the body of said element.

6. A scale including a base, a beam, means extending from said base for rockingly mounting said beam, a flexion strip, means for connecting one end of said strip to retain the same against movement with respect to said base, a registering mechanism including an indicating member secured to the opposite end of said strip with the said member extending substantially centrally of the strip and means for connecting the latter end of the strip to the beam.

7. A scale including a frame, a rockingly mounted beam carried by said frame, a flexion strip secured at one end to said frame, a registering mechanism associated with the other end thereof, a contact element carried by said strip and presenting an arcuate face and a connecting member secured to said element and bearing against the curved face thereof, said member being secured to said beam.

8. A scale including a rockingly mounted beam, a flexion strip, means for supporting said flexion strip at one end thereof, a connecting member extending upwardly from said beam, a contact element presenting a curved outer face and carried by the outer end of said strip, a registering mechanism forming a part of said scale and said connecting member being secured to the upper end of said contact element whereby, as said beam moves downwardly, to depress the outer end of said flexion strip and actuate said registering mechanism.

9. A scale including a flexion strip means for supporting said flexion strip at one end thereof, a contact element presenting an outer face corresponding to that of a cam, a registering mechanism connected to said element, means for securing said element to the outer end of said strip, a rockingly mounted beam and a connecting member extending from said beam to the upper end of said element and in contact with the said face thereof.

10. A scale including a flexion strip means for supporting said flexion strip at one end thereof, a contact element rockingly secured to the outer end of said flexion strip, means for normally retaining said element against rocking movement with respect to said strip, a rockingly mounted beam, a connecting member extending from said beam to said element and a registering mechanism connected to said strip.

11. A scale including a rockingly mounted beam, a flexion strip, means for supporting said flexion strip at one end thereof, means for clamping the other end of said strip and an adjusting element associated with said last named means and shiftable longitudinally of said strip to vary the resistance offered by the latter.

12. A scale including a rockingly mounted beam, a resilient element to be flexed longitudinally of its body, a base for mounting one end of said element and supporting said beam, a curved member secured to the opposite end of said element and means connecting said beam adjacent its end to said curved element.

13. A scale including, in combination, a base, a beam, means for rockingly supporting one end of said beam, a flexion element mounted by said base, a registering mechanism associated with said element, a curved member extending transversely of said beam and also secured to said element and means connecting said curved member to the free end of said beam.

14. A scale including a base, a beam, means extending from said base and rockingly mounting one end of said beam, a flexion strip, means for mounting one end of said flexion strip upon said base, a curved element secured to the opposite end of said strip and extending transversely of said beam and a flexible member secured to the free end of said beam and connected to ride upon the curved face of said element.

15. A scale including a base, a beam rockingly mounted upon said base, a flexion strip supported by said base and having one of its ends fixed against movement with respect thereto, a curved element adjustably connected to the opposite end of said strip, a tape connected to operatively bear against the curved face of said element and means connecting the end of said strip to said beam.

16. A scale including a base, a flexion strip carried by said base, a beam rockingly mounted by said base, a pan support beyond one end of said point of rocking mounting and associated with said beam, a push-rod connected to the other end of said beam, a strap connected to said rod, a curved contact element secured to said flexion strip and a flexible member connected to ride against the curved face of said element and secured to said rod.

In testimony whereof I affix my signature.

GEORGE WALKER.